May 23, 1933.  E. G. PETERSEN  1,910,906
RADIATOR SHUTTER
Filed April 11, 1930  7 Sheets-Sheet 1

May 23, 1933. E. G. PETERSEN 1,910,906
RADIATOR SHUTTER
Filed April 11, 1930 7 Sheets-Sheet 2

May 23, 1933.  E. G. PETERSEN  1,910,906
RADIATOR SHUTTER
Filed April 11, 1930   7 Sheets-Sheet 3
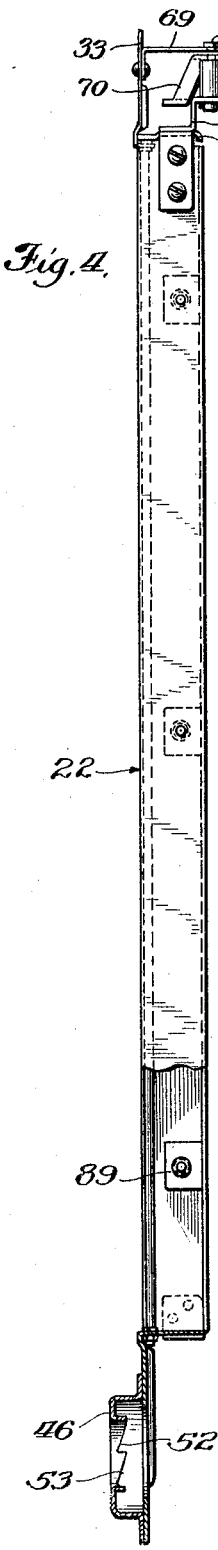
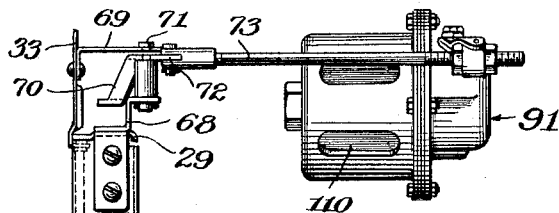
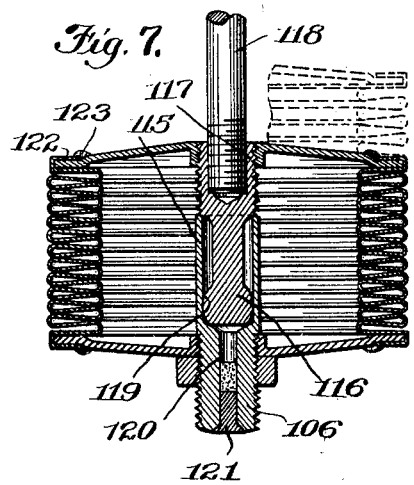
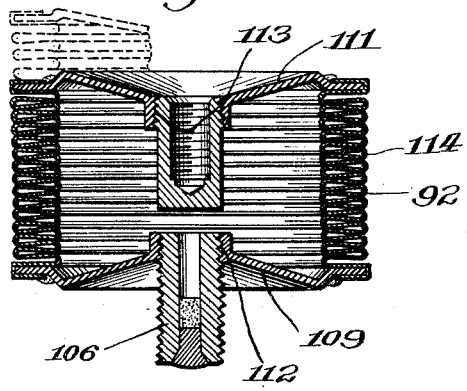
Inventor
Edgar G. Peterson
By Williams, Bradbury, McCaleb & Hinkle
Attys.

May 23, 1933.  E. G. PETERSEN  1,910,906
RADIATOR SHUTTER
Filed April 11, 1930  7 Sheets-Sheet 4
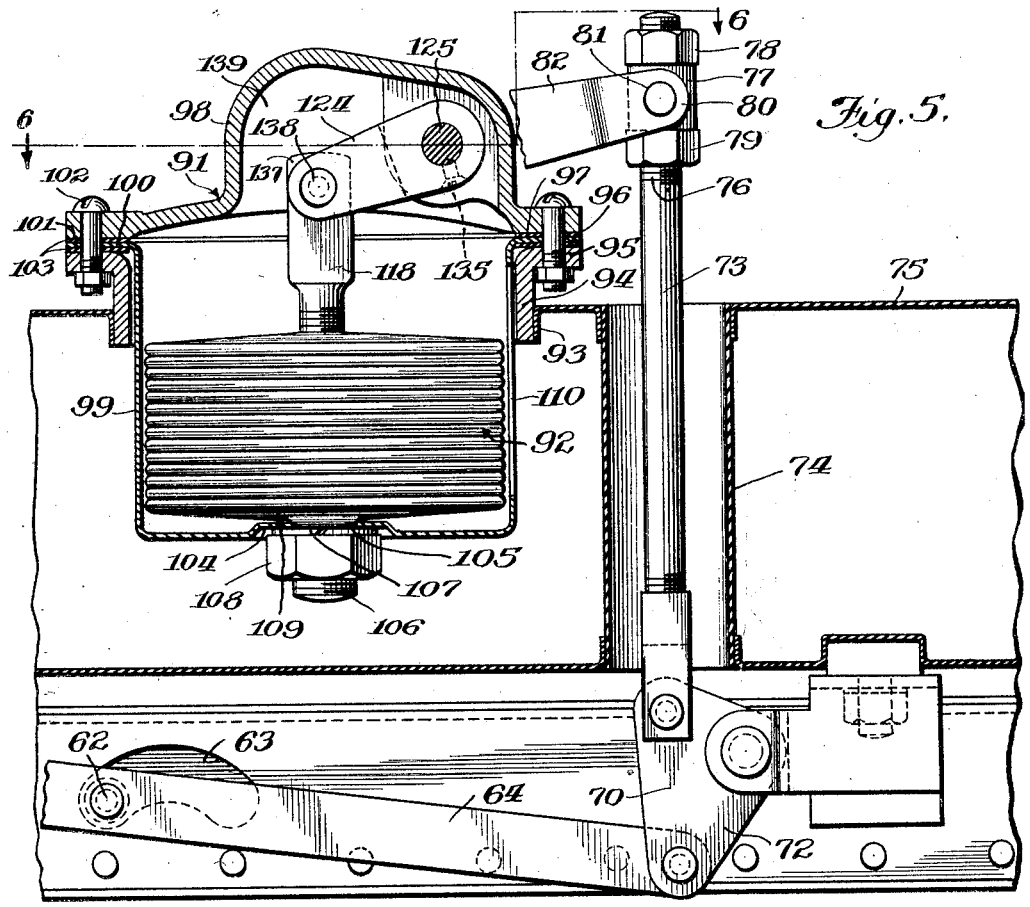
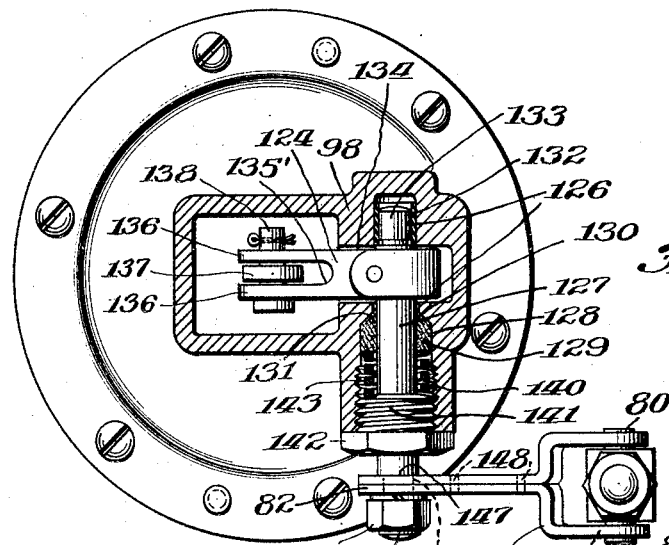
Inventor
Edgar G. Petersen
By Williams, Bradbury, McCaleb & Hinkle
Attys.

May 23, 1933.  E. G. PETERSEN  1,910,906
RADIATOR SHUTTER
Filed April 11, 1930  7 Sheets-Sheet 5
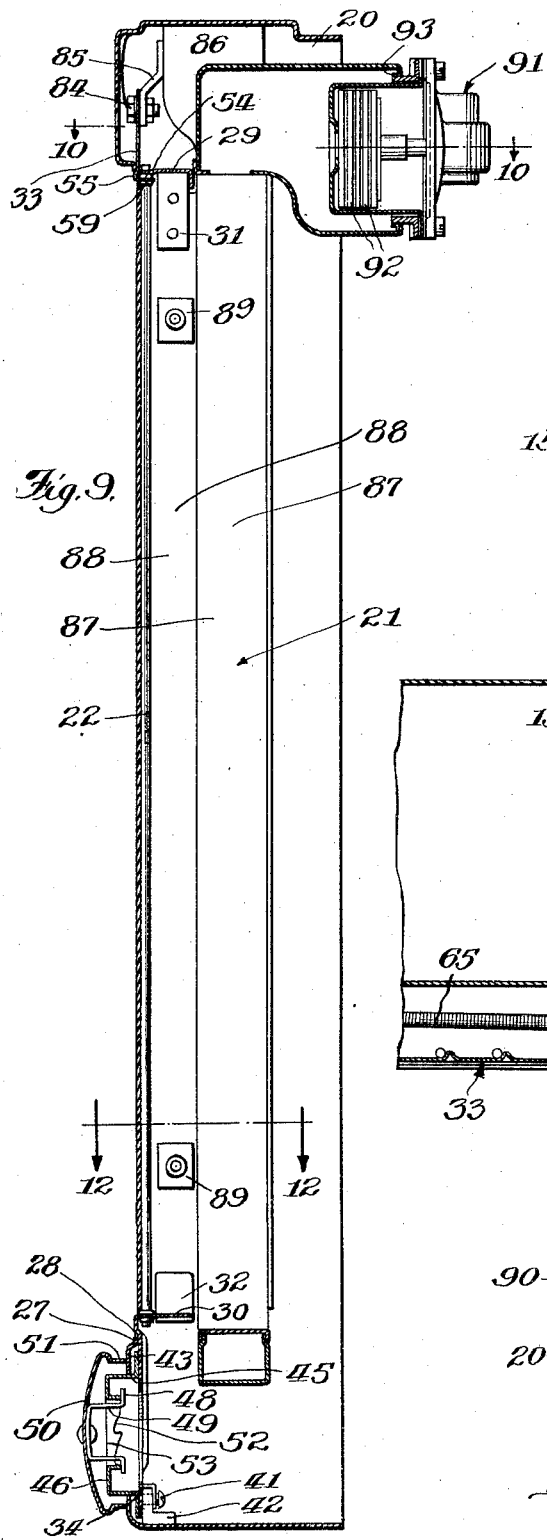
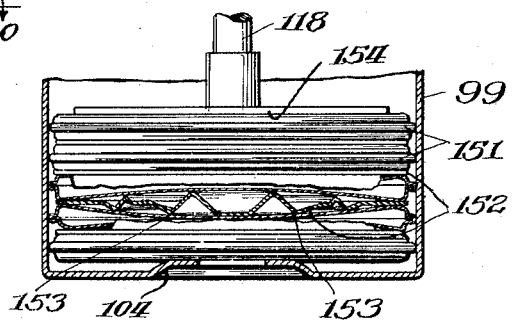
Fig. 11.
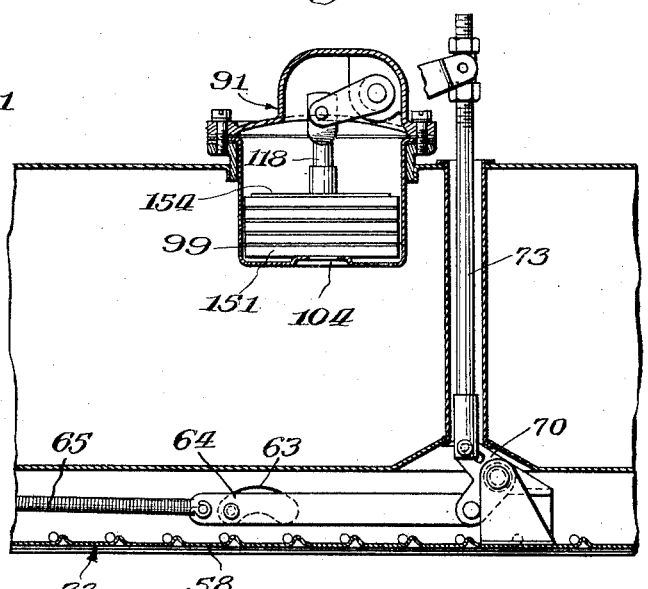
Fig. 10.
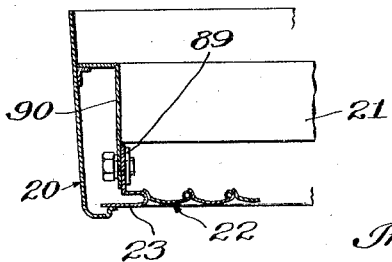
Fig. 12.
Inventor
Edgar G. Petersen
By Williams, Bradbury, McCaleb & Hinkle
Attys.

May 23, 1933. E. G. PETERSEN 1,910,906
RADIATOR SHUTTER
Filed April 11, 1930 7 Sheets-Sheet 6

Inventor
Edgar G. Petersen
By Williams, Bradbury
McCaleb & Hinkle Attys.

May 23, 1933. E. G. PETERSEN 1,910,906
RADIATOR SHUTTER
Filed April 11, 1930 7 Sheets-Sheet 7
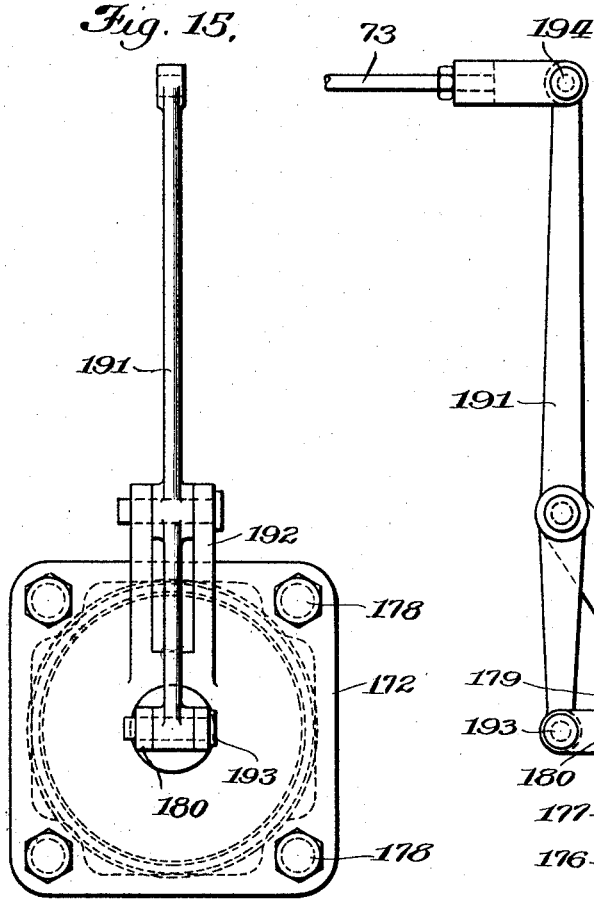
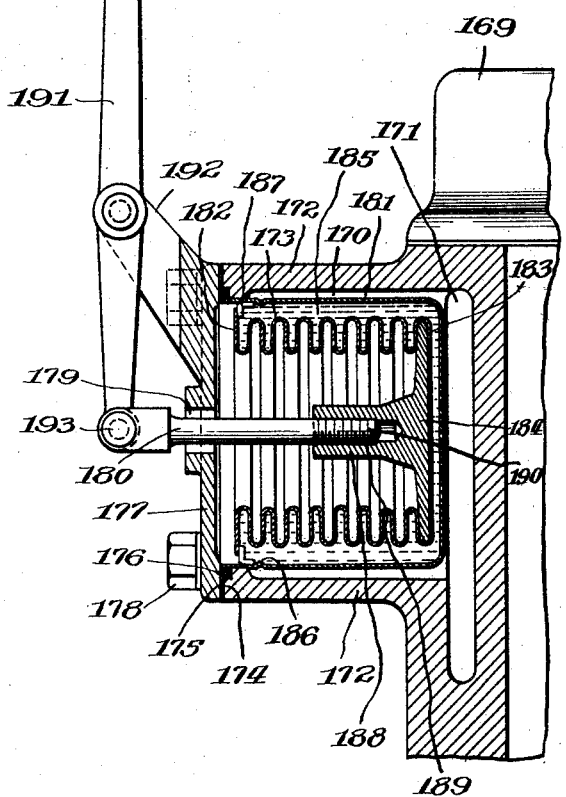
Fig. 15.
Fig. 14.
Inventor
Edgar G. Petersen
By Williams, Bradbury,
McCaleb & Hinkle Attys.

Patented May 23, 1933

1,910,906

UNITED STATES PATENT OFFICE

EDGAR G. PETERSEN, OF CHICAGO, ILLINOIS, ASSIGNOR TO PINES WINTER-FRONT COMPANY, OF CHICAGO, ILLINOIS, A CORPORATION OF DELAWARE

RADIATOR SHUTTER

Application filed April 11, 1930. Serial No. 443,274.

The present invention relates to radiator shutters and is particularly concerned with built-in shutters for radiators of internal combustion engines.

One of the objects of the present invention is the provision of an improved thermostatic shutter of the built-in type.

Another object is the provision of an improved thermostatic controlling unit which is adapted to be applied to any of a plurality of different commercial radiator structures to provide a thermostatically controlled shutter of the built-in type, which may be installed by the manufacturer of the car.

Another object is the provision of an improved thermostatic actuating unit which is peculiarly adapted to be located in the water box of the radiator core, with the thermostatic elements in contact with the water in the radiator core to provide a more sensitive and effective shutter actuating device.

Another object is the provision of a shutter controlling unit of the class described, which may be economically manufactured and maintained in water-tight condition to prevent the possibility of the loss of cooling fluid.

Another object is the provision of an improved shutter unit which is lighter, yet stronger, than the shutters of the prior art, which is rattle-proof when properly installed on the car, and which is capable of maintaining more accurate adjustment for thermal operation at predetermined temperature.

Other objects and advantages of the invention will be apparent from the following description and from the accompanying drawings, in which similar characters of reference indicate similar parts throughout the several views.

Referring to the drawings, of which there are seven sheets;

Fig. 4 is a side elevational view of the shutter unit and thermostatic unit of Fig. 2;

Fig. 5 is a sectional view taken on the plane of the line 5—5 of Fig. 1, showing the details of the construction of the thermostatic unit, top of shutter unit and connecting mechanism;

Fig. 6 is a sectional view of the mechanism of the thermostatic unit taken on the plane of the line 6—6 of Fig. 5;

Fig. 7 is an axial, sectional view of the thermostatic element employed in Fig. 5;

Fig. 8 is a similar view of a modified form of thermostatic element;

Fig. 9 is a vertical, sectional view taken on the plane of the line 9—9 of an assembly similar to Fig. 1, with a modified form of thermostatic element;

Fig. 10 is a plan view in partial section, taken on the plane of the line 10—10 of Fig. 9;

Fig. 11 is an enlarged detail view of a part of the thermostatic unit illustrated in Fig. 10;

Fig. 12 is a horizontal sectional view of one side of the assembly of Fig. 9, taken on the plane of the line 12—12 of Fig. 9;

Fig. 14 is a vertical sectional view of another modification, in which the thermostat is located in the engine block for direct contact with the cooling fluid carried by the water jacket;

Fig. 15 is a front elevational view of the device of Fig. 14.

Figure 1:
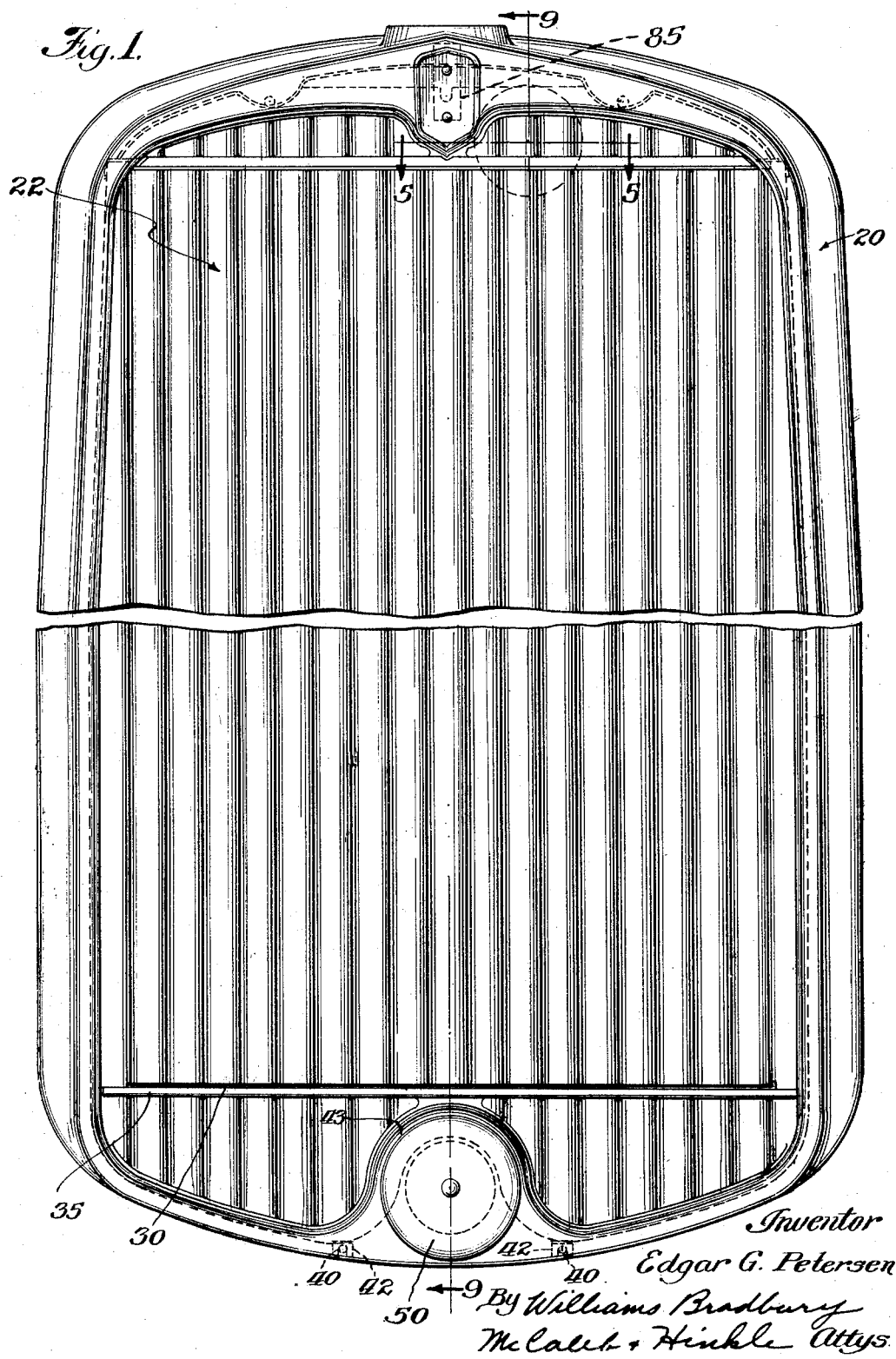
Fig. 1 is a front elevational view of the radiator shutter assembly, constructed according to the present invention.

Referring to Figs. 1 and 9, the radiator shutter assembly constructed according to the present invention, preferably includes a radiator core 20, a radiator shell 21, and a radiator shutter unit 22. The radiator core and shutter unit may conform in all of their details to the description in my prior application, Case 5, Radiator shutter units, filed March 19, 1930, Serial No. 436,940, which is directed particularly to the structure of the radiator shutter unit.

This radiator shutter unit 22 includes side frame members 23, 24, having laterally projecting resilient flanges 25, 26, for enclosing the space between the shutter unit and the edge of shell 20, and for resiliently engaging the contacting edge 27 which forms the inner boundary of a fenestration 28 in the front of the radiator shell.

The side frame members 23 and 24 are fixedly secured to the upper and lower end frame members 29, 30, by means of the attaching flanges 31, 32, and each of the end frame members 29, 30 is preferably provided with a false shutter apron 33, 34, for enclosing that portion of the radiator core 20 above and below the shutter unit. The lower frame member 30 is preferably formed with a transversely extending and forwardly projecting rib 35 for housing a bearing strip 36 and with a plurality of stamped formations 37 of the same size and shape as the shutters 38 carried by the shutter unit.

The false shutter plate 34 may form an integral part of the lower frame member 30, and is preferably provided with a relatively flat border 39 for engaging the inside of the contacting edge 27 of the radiator shell fenestration 28.

The false shutter plate is also provided with a pair of inwardly extending slots 40 for engaging screw bolts 41 carried by sheet metal brackets 42 welded or otherwise secured to the inside of shell 20 at the bottom, and the shell 20 is preferably provided with a centrally located upward extension 43 carried by the front and bottom of the shell for enclosing the false shutter plate 34 about the crank shaft aperture 44.

The false shutter plate 34 may then be provided with a cap plate 45 welded on the false shutter plate in position to extend outward through the opening 46 in the shell extension 43. The cap plate 45 preferably has a pair of bayonet slots 47 formed therein for engagement with the outwardly bent ends 48 of a U-shaped spring 49 carried by the crank hole cap 50. The crank hole cap 50 is preferably of sufficient size so that its outer edge 51 is adapted to engage the radiator shell extension 43 about the cap plate 45 when the parts are in assembled relation as shown in Fig. 9.

It will thus be observed that the extension 43 of radiator shell 20 may be clamped between the crank hole cap and the false shutter plate 34 by inserting the cap in place and turning it in a clockwise direction, the ends 48 of spring 49 slidably engaging the inwardly sloping edges 52 of the flange 53 which surrounds the aperture in cap plate 45. The crank hole cap is thus adapted to prevent rattling between the false shutter plate and the radiator shell at the bottom, and the extension 43 is forced into resilient engagement with the false shutter plate, the contacting flange 27 engaging the flat surface 39 on the false shutter plate.

The upper frame member 29 is secured to the side frame members 23, 24 by bolts or other convenient fastening means passing through said side frame members, and the attaching flanges 31 carried by upper frame member. The upper frame member 29 also supports a bearing strip 54 and the bearing strip 54 is enclosed and protected in a housing 55 forming a part of the upper false shutter plate 33.

The upper false shutter plate 33 comprises a plate of sheet metal formed with a relatively flat surface 56 about its border, with a plurality of stamped shutter formations 57 and with a rib 58 capable of receiving the upper frame member 29 and bearing strip 54. The false shutter plate 33 may be secured together by riveting together the upper frame member 29, bearing strip 54 and horizontally extending flange 59 which is carried by the shutter plate 33.

The shutter unit 22 also includes a plurality of shutters 38 pivotally mounted in the bearing strips 36, 54, and the shutters 38 are each preferably provided with rearwardly extending shutter arms 60 which are pivotally connected to the shutter actuating bar 61. Shutter actuating bar 61 is provided with a fixed stud 62 which projects upward through an arcuate slot 63 in upper frame member 29 and the stud 62 is pivotally connected to a link 64. A coil spring 65 is tensioned between a sheet metal bracket 66 and a stud 67 carried by link 64, urging the shutter actuating bar 61 to the left in Fig. 2, and tending to maintain the shutters in closed position.

The upper frame member 29 also carries a bracket 68 and the false shutter plate 33 carries a bracket 69 for pivotally supporting a bell crank 70 upon a bolt 71. One arm 72 of bell crank 70 is pivotally connected to link 64, while the other arm is pivotally connected to one end of a connecting rod 73. The connecting rod 73 passes through a conduit 74 in the water box 75 of core 20, and is preferably provided with a threaded end 76 for adjustably supporting a bearing 77 by means of a pair of lock nuts 78, 79.

The bearing 77 comprises a block of metal having an aperture for receiving connecting rod 73 and having a pair of trunnions 80 adapted to be received in bearings 81 formed in the bifurcated crank arm 82.

The false shutter plate 33 is preferably provided with a slot 83 for receiving a screw bolt 84, carried by a bracket 85 which is brazed or otherwise secured to the radiator spout 86 or some other part of water box 75. The radiator core 21 preferably includes a core band 87 having forwardly extending flanges 88 which are located to slidably engage the side frame members 23, 24.

The side frame members 23, 24 are preferably provided with threaded members 89 spot welded to said side frame members, and the radiator shutter unit 22 may be carried by the side flanges 88 of the core 21. The radiator shell 20 may be supported upon the chassis of the vehicle, and the core 21 may also be provided with backwardly extending flanges 90 which are secured to the inside of shell 20 substantially as described in said prior application.

The water box 74 is preferably provided with an improved shutter actuating unit 91 having one or more thermostatic elements 92 which are located inside the water box 75 for direct contact with the water or other cooling fluid. For this purpose the water box 75 is formed with an inwardly extending annular flange 93 which may be brazed or welded to the cylindrical flange 94 of the supporting ring 95.

The supporting ring 95 has a seating surface 96 which is adapted to cooperate with a similar seating surface 97 on a cover 98 to form a water-tight closure for this part of the water box.

In order to support the thermostatic element 92 within the water box 75, the thermostatic unit 91 is preferably provided with a casing 99 which may consist of a substantially cylindrical sheet metal casing having an outwardly extending annular flange 100 for engagement between the seating surfaces 96 and 97 on cover 98 and ring 95. The attaching flange 101 on the cover 98, the flange 100 on casing 99 and the ring 95 are each provided with registering apertures for receiving screw bolts 102, and gaskets 103 of cork or other waterproof material may be interposed between the flange 100 and the seating surfaces 96, 97.

The cylindrical casing 99 is preferably provided with an inwardly projecting formation 104 located at its inner end and with an aperture 105 for receiving the threaded member 106 carried by the thermostatic element 92. The thermostatic element 92 may be secured in place by means of a lock washer 107 and a nut 108 which clamps the end of casing 99 between end plate 109 of the thermostatic element 92 and the nut 108.

The casing 99 is also provided with a plurality of longitudinally extending slots 110, permitting access of the water or other cooling fluid to the interior of the casing 99 where the cooling fluid comes into direct contact with the outside of the thermostatic element 92.

Referring to Figs. 7 and 8, two forms of the thermostatic element of the type shown in Fig. 5 are illustrated in detail in these figures. The thermostatic element or bellows 92 preferably includes end plates 109, 111, which may be provided with threaded bores 112, 113, and the end plates 109, 111 are secured together to form an expansible chamber by a side wall 114 having a plurality of radially extending corrugations. The side wall 114 is constructed of resilient and flexible sheet metal in such manner that the bellows may be extended to the dotted line positions shown in Figs. 7 and 8 by the expansion of volatile fluid contained within the bellows 92.

In the embodiment of Fig. 7, the end plate 109 is provided with a threaded member 106 which extends into the bellows 92 and which is provided with an axially extending bore 115 forming a guide for a plunger 116. The plunger 116 is carried by the threaded member 117, which is fixedly secured to a connecting rod 118 and the end of the plunger 116 is preferably formed with a ball 119 permitting a limited amount of universal movement between plunger 116 and bore 115 as the bellows expands.

Each of the threaded members 106 is preferably provided with a bore 120 which is utilized for filling the bellows with a volatile fluid, and which is closed by one or more metallic plugs 121 after the bellows has been filled.

The ends of the side wall 114 are preferably provided with inwardly extending annular flanges 122 which engage the end plates 109, 111 and secure the side walls to the end plates. The flanges 122 are also soldered to end plates 109, 111, as at 123, in order to assure a fluid-tight joint, and solder may also be run over all of the joints between the threaded members 106, 117, and the other parts of the bellows. When the bellows has been completed, each of the exposed joints is preferably soldered to assure the provision of an expansible member which is fluid-tight at all points.

The connecting rod 118 which is carried by threaded member 117 of bellows 92, is pivotally connected to a crank arm 124 carried by a shaft 125 rotatably mounted in cover 98. The cover 98 is preferably provided with a transversely extending bore 126 for rotatably receiving shaft 125 and with a counterbore 128 for receiving a packing 129. The counter-bore 128 tapers at 130 into the bore 126, thereby giving the packing 129 a relatively thin tapered edge 131 for producing a water-tight seal.

The bore 126 is also preferably provided with a sleeve 132 of bearing metal for receiving the inner end 133 of shaft 127, and the cover 98 is formed with a slot 134 on its inside communicating with the bore 126. The side walls of slot 134 form thrust bearings for engagement with the crank arm 124 which may be secured to shaft 127 by a set screw 135, thereby retaining shaft 127 in the bore 126.

The crank arm 124 may be formed with a slot 135' forming the bifurcated ends 136 for receiving the end 137 of connecting rod 118. A pin 138 pivotally connects connecting rod 118 to crank arm 124 and the cover 98 is provided with a recess 139 for permitting the necessary movement of crank 124 during expansion of the bellows 92.

The counter-bore 128 is threaded at its outer end 140 to receive the threaded member 141 which closes the counterbore 128. Threaded member 141 is provided with an axially located bore for receiving shaft 127 and with a non-circular flange 142 for engagement with a wrench or other tool. A coil spring 143, preferably formed of flat material, is tensioned between threaded member 141 and the packing 129 to exert a substantially constant pressure on packing 129 and take up any wear in the packing 129. The shaft 127 is thus provided with a water-tight packing which is automatically maintained in operative condition, and a water-tight joint may be maintained by the present construction with a minimum amount of frictional resistance to the movement of shaft 128.

The outer end of shaft 128 may be provided with a flattened portion 144 adapted to be received in a complementary aperture in the crank arm 82 and the reduced end 145 of shaft 125 may be threaded so that the crank arm 82 may be clamped between nut 146 and shoulder 147.

The crank arm 82 may consist of a pair of similar sheet metal members spot welded together at a plurality of points 148, each sheet metal member being formed with an offset 149 and with a substantially parallel bearing flange 150 having an aperture 81 forming a bearing for the trunnion 80.

Referring to Figs. 9 and 10, a modified form of thermostatic element is utilized in the thermostatic actuating unit 91 of these figures. In this embodiment the casing 99 is provided with the inwardly extending pressed formation 104 for engaging the middle of a thermostatic wafer 151. The casing 99 slidably supports a plurality of the wafers 151 between which there are interposed spacers 152, having corrugations 153 for engaging the central portions of adjacent wafers. The spacers 152 maintain the wafers 151 in operative engagement, although the side walls of the wafers may contract inward beyond the edges of the wafers. The uppermost wafer 151 is engaged by a plate 154 which is carried by connecting rod 118, but all other parts of the shutter actuating unit may be substantially the same.

Figure 13:
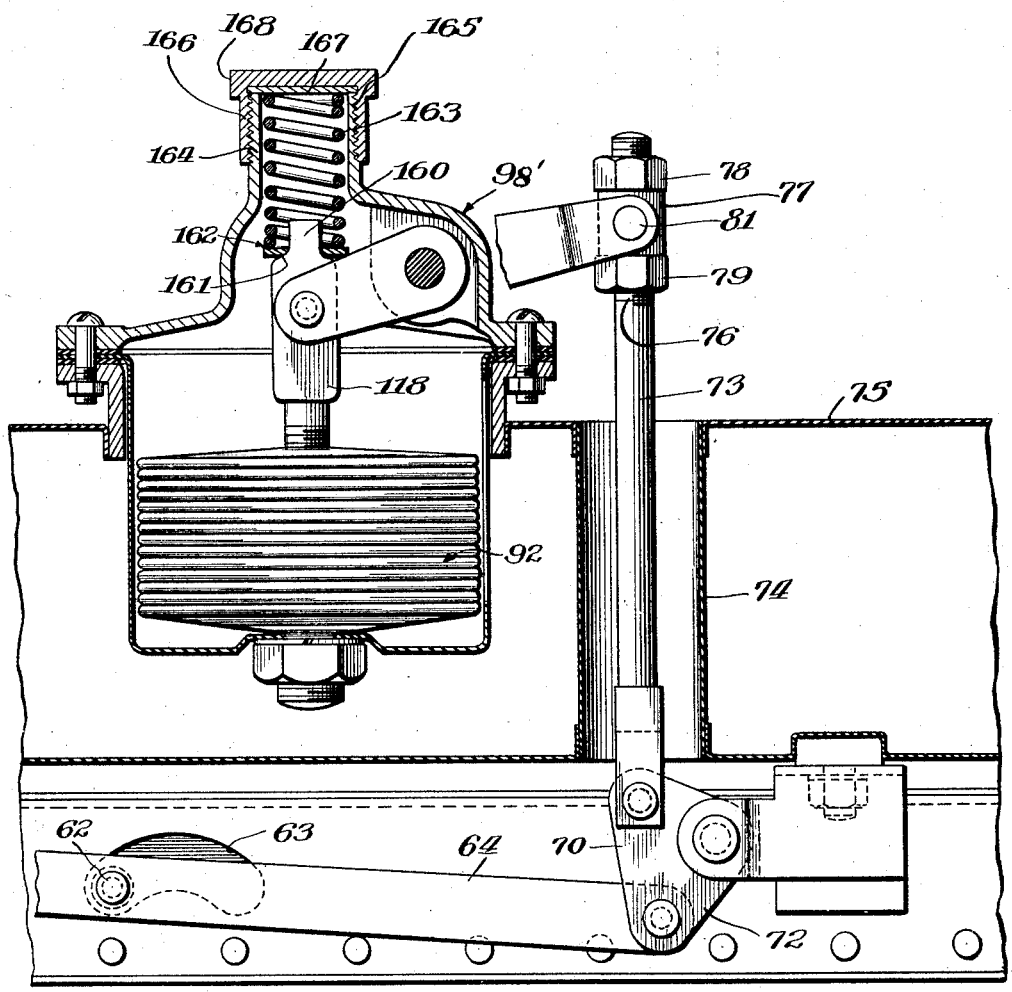
Fig. 13 is a view similar to Fig. 5 of another modified form of thermostatic shutter control having an auxiliary adjustment for changing the characteristics of the controlling device under different conditions.

Referring to Fig. 13, this is a modified construction having a controlling device which is provided with an auxiliary adjustment for making the thermostatic control more adaptable to various conditions. In this embodiment, all of the details of the shutter unit, and most of the details of the controlling mechanism may be substantially the same as that described with respect to Fig. 5.

The connecting rod 118 is preferably provided with an extension 160, which may be reduced in size, forming a shoulder 161 adapted to support a washer 162, forming a seat for a helical spring 163. The cover plate 98' of the thermostatic controlling device is also preferably formed with a substantially cylindrical protuberance 164, providing an enclosure for the coil spring 163, which enclosure is in substantial alignment with the connecting rod 118.

The cylindrical portion 164 of cover plate 91 may be provided with threads 165 adapted to receive complementary threads upon a screw cap 166, and the screw cap is preferably provided with a gasket 167, which may be confined between the inside of the cap and the end of a cylindrical portion 164 of the cover plate 98'.

The outer edge 168 of the cap is preferably knurled to facilitate manual removal or adjustment of the cap 168, and it will thus be observed that the tension of the spring 163, which is confined between cap 166 and washer 162, may be varied by the adjustment of cap 166. The cap 166 may also be readily removed and a heavier spring inserted for adapting the thermostatic device to engines with which it may be desirable to operate at a warmer temperature.

Furthermore, the coil spring 163 may readily be removed and a lighter or heavier spring quickly substituted to adapt the controlling device for different temperature conditions, and if it is desired, to make the shutters open more readily, as for instance, in warm weather, a lighter spring may be inserted. All of the other details of this embodiment may be exactly the same as that described with respect to Figs. 5 and 6.

Referring to Figs. 14 and 15, this is a modified form of controlling device, in which the thermostatic element is preferably located within the engine block 169 in an auxiliary chamber 170, which is in communication with the usual water passages 171 of the water jacket. For this purpose, the engine block 169 may be formed with forwardly extending walls 172 of sufficient width to provide the chamber 170 for a thermostatic device 173. The walls 172 are preferably formed with an outer seating surface 174 adapted to engage an attaching flange 175 of the thermostatic element 173, and the flange 175 may be secured by clamping said flange between seating surface 174 and a complementary seating surface 176 formed upon a cover plate 177.

The cover plate 177 preferably comprises a metal member formed with apertures for receiving a plurality of screw bolts 178, which pass through the cover plate and are threaded into the walls 172, and the cover plate is also formed with a centrally located aperture 179 for passing a connecting rod 180.

The thermostatic element 173 preferably consists of a substantially cylindrical sheet metal casing, which is open at one end and provided at the open end with the attaching flange 175. Sufficient space is provided between the cylindrical member 181 and the inner surface of walls 172 to permit the cooling fluid or water from the water jacket to circulate in the chamber 170 and come into direct contact with the wall 181 of the thermostatic device.

The cylindrical member 181 is provided with an annulus 187, having a pair of flanges at right angles, one flange being brazed, soldered, welded, or otherwise secured inside the cylindrical member 181, and the other flange being similarly secured to one of the end flanges 182 of a round corrugated sheet metal expansible member, usually termed a "bellows". The other end of the bellows is preferably formed with an inwardly extending flange 183 and secured to an end plate 184 by clamping the edge of the end plate 184 within one of the corrugations and brazing, welding or soldering these parts together.

The bellows 173 and the cylindrical member 181 form a chamber 185, which is filled with any desirable thermostatic fluid, having a high coefficient of expansion. The cylindrical member 181 may be provided with an inwardly extending bead 186 for definitely determining the position of the annulus 187.

The end plate 184 of the thermostatic element 173 is preferably formed with an inwardly extending boss 188, having a threaded bore 189 for receiving the threaded end 190 of the connecting rod 180. The opposite end of the connecting rod 180 may be connected to any convenient mechanism for transmitting the motion of the end plate 184 to the shutters, such, as for instance, the lever 191, which is pivotally mounted upon a pair of arms 192 carried by cover plate 177. One end of lever 191 is pivotally connected to connecting rod 180 by means of a pin or rivet 193, and the opposite end of lever 191 may be connected by means of a pin or rivet 194 to a connecting rod 73, similar in construction to those described in the previous embodiments.

When the thermal fluid in the chamber 185 expands, the corrugated member 173 will contract, causing the connecting rod 180 to move outward and moving the lever 191 in a clockwise direction, transmitting a pull to connecting rod 73, and consequently, the bellcrank 70, illustrated with respect to the other embodiments, should be reversed when utilized with the assembly shown in Figs. 14 and 15.

Figure 2:
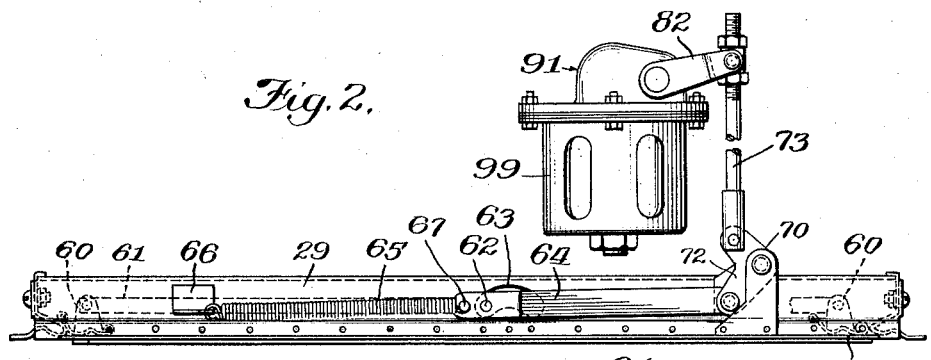
Fig. 2 is a plan view of the shutter unit and the thermostatic unit separated from the radiator core and shell.
Figure 3:
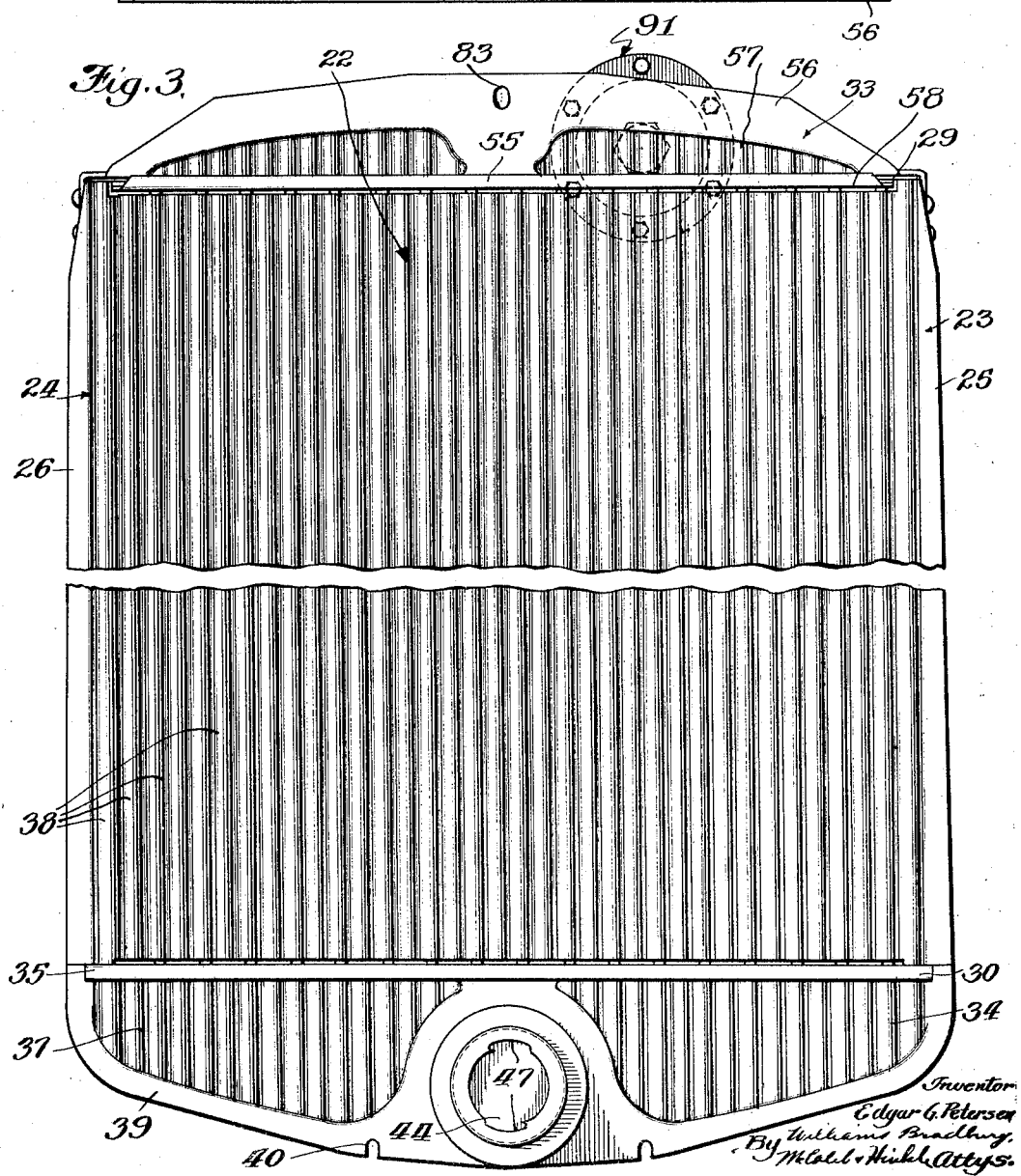
Fig. 3 is a front elevational view of the radiator shutter unit shown in Fig. 2.

The operation of the shutters constructed according to the present disclosure, is as follows:

The coil spring 65 normally maintains the shutter bar 61 in the position of Fig. 2, urging the shutters to closed position and tending to move bellcrank 70 clockwise. Spring 65 also tends to move crank arm 82, shaft 125 and crank arm 124 in a counter-clockwise direction, tending to compress the bellows 92 or to maintain plate 154 in engagement with wafers 151.

The thermostatic bellows 92 or wafers 151 are in direct contact with the water in the water box 75 and the casing 99 of the thermostatic actuating unit 91 is filled with cooling fluid through the apertures 110 which maintain communication between this casing and the water box. The thermostatic elements are thereby directly subjected to the temperature condition of the water and the shutters are adapted to be actuated more quickly and they are more directly responsive to the temperature conditions in the radiator than are the shutters located elsewhere, in which heat must be conducted by radiation or conduction through the walls of the radiator or other parts.

When the thermostatic element expands, crank 125 is moved clockwise, bell crank 90 counter-clockwise and the shutter bar 61 is moved to the right against the tension of spring 65 to open the shutters 38. The shutters are preferably so adjusted by means of the adjustable lock nuts 78, 79 so that they will be actuated at a predetermined temperature which may be substantially the most efficient operating temperature of the internal combustion engine.

The thermostatic actuating devices 91 may be manufactured and sold as commercial units to the manufacturers of automobiles who desire to install shutters of the built-in type, and the present thermostatic actuating unit is capable of application to practically any type of modern automotive vehicle.

It will thus be observed that I have invented an improved form of built-in shutter including an improved thermostatic unit for actuating radiator shutters having the thermostatic element disposed for direct contact with the heated water. The present thermostatic unit includes operative mechanical connections between the thermostat and shutters which pass through the wall of the water box, but which are capable of being maintained watertight automatically for a long period of time, without the necessity for repair or replacement, and without possibility of loss of the cooling fluid.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a thermostatic shutter unit, the combination of a radiator core having a water box with an aperture in one wall, an annular metal member secured to said wall to support a thermostatic unit, a seating surface on said annular member, a thermostatic unit comprising a metal frame having means for expansibly supporting a thermostatic element, a cover plate, common means for securing said frame, annular member and cover together, a rotatable shaft carried by said cover and projecting therefrom, and operative mechanical connections between said shaft and thermostatic element.

2. In a thermostatic shutter unit, the combination of a radiator core having a water box with an aperture in one wall, an annular metal member secured to said wall to support a thermostatic unit, a seating surface on said annular member, a thermostatic unit comprising a metal frame having means for expansibly supporting a thermostatic element, a cover plate, common means for securing said frame, annular member and cover together, a rotatable shaft carried by said cover and projecting therefrom, and operative mechanical connections between said shaft and thermostatic element, including a crank on said shaft, a connecting rod pivotally secured to said crank, and a plate carried by said connecting rod for engaging said thermostatic element.

3. In a thermostatic shutter unit, the combination of a radiator core having a water box with an aperture in one wall, an annular metal member secured to said wall to support a thermostatic unit, a seating surface on said annular member, a thermostatic unit comprising a metal frame having means for expansibly supporting a thermostatic element, a cover plate, common means for securing said frame, annular member and cover together, a rotatable shaft carried by said cover and projecting therefrom, and operative mechanical connections between said shaft and thermostatic element, including a crank on said shaft, a connecting rod pivotally secured to said crank, and a plate carried by said connecting rod for engaging said thermostatic element, a plurality of shutters carried by said core, a shutter bar for actuating said shutters and mechanical connections between said shutter bar and said shaft.

4. A thermostatic unit for actuating shutters and the like, comprising a cylindrical metal casing having apertures in its side for access of heated fluid to the inside of said casing, a thermostatic bellows having an end plate with a threaded stud projecting therefrom, said stud being secured in the end wall of said casing, a cover plate for said casing, said bellows having another end plate a bell crank carried by said cover plate, and operative connections between one arm of said bell crank and the other end plate of said bellows.

5. A thermostatic unit for actuating shutters and the like, comprising a cylindrical metal casing having apertures in its side for access of heated fluid to the inside of said casing, a thermostatic bellows having an end plate with a threaded stud projecting therefrom, said stud being secured in the end wall of said casing, a cover plate for said casing, said cover plate having a bore and a counter-bore, a shaft in said bore, an operative mechanical connection between said bellows and said shaft a packing in said counter-bore, and means carried by said counter-bore for maintaining said packing under substantially constant pressure.

6. A thermostatic unit for actuating shutters and the like, comprising a cylindrical metal casing having apertures in its side for access of heated fluid to the inside of said casing, a thermostatic bellows having an end plate with a threaded stud projecting therefrom, said stud being secured in the end wall of said casing, a cover plate for said casing, said cover plate having a bore and a counter-bore, a shaft in said bore, a packing in said counter-bore, means carried by said counter-bore for maintaining said packing under substantially constant pressure, said cover having an internal slot communicating with said bore, and a crank carried by said shaft in said slot and operatively connected with one end of said bellows.

7. In a thermostatic unit the combination of a sheet metal casing with a metal cover carried thereby, said cover having a transverse bore with a slot at right angles to said bore and communicating with the interior of said casing, a shaft rotatably mounted in said bore, a crank arm carried by said shaft in said slot, a thermostatic element in said casing and operative mechanical connections between said crank arm and said element.

8. In a thermostatic unit the combination of a sheet metal casing with a metal cover carried thereby, said cover having a transverse bore with a slot at right angles to said bore and communicating with the interior of said casing, a shaft rotatably mounted in said bore, a crank arm carried by said shaft in said slot, a thermostatic element in said casing, operative mechanical connections between said crank arm and said element, said casing having a counter-bore about the outer end of said shaft, a packing in said counterbore, and a threaded member for rotatably supporting said shaft and compressing said packing carried by said cover.

9. In a thermostatic unit the combination of a sheet metal casing with a metal cover carried thereby, said cover having a transverse bore with a slot at right angles to said bore and communicating with the interior of said casing, a shaft rotatably mounted in said bore, a crank arm carried by said shaft in said slot, a thermostatic element in said casing, operative mechanical connections between said crank arm and said element, said casing having a counter-bore about the outer end of said shaft, a packing in said counterbore, a threaded member for rotatably supporting said shaft and compressing said packing carried by said cover, and a coil spring tensioned between said threaded member and said packing.

10. In a radiator shutter for internal combustion engines, the combination of a radiator core with a radiator shutter unit having a plurality of movable shutters for controlling the flow of air through said core, said core having a water chamber communicating with the core, a shutter controlling thermostat mounted in said water chamber, an operative mechanical connection between said shutter controlling thermostat and said shutters, said operative connection including a movable shaft extending into said water chamber from outside said water chamber, and a water-tight joint about said shaft whereby said shutters may be actuated by a thermostat located within said water chamber.

11. A thermostatic unit for radiator shutters comprising a casing having a substantially cylindrical chamber for receiving a thermostat, a cover for said chamber having a transversely extending bearing, a connecting rod engaging said thermostat and extending transversely to said bearing, a shaft in said bearing, a crank on said shaft engaging said connecting rod, a packing surrounding said shaft, and a second crank connected to said shaft.

12. A thermostatic unit for radiator shutters comprising a casing having a substantially cylindrical chamber for receiving a thermostat, a cover for said chamber having a transversely extending bearing, a connecting rod engaging said thermostat and extending transversely to said bearing, a shaft in said bearing, a crank on said shaft engaging said connecting rod, a packing surrounding said shaft, a second crank connected to said shaft, said second crank comprising a pair of metal members secured together in parallel relation and having spaced ends, a block pivotally mounted between said spaced ends, and a second connecting rod having said block pivotally mounted thereon.

13. A thermostatic unit for radiator shutters comprising a casing having a substantially cylindrical chamber for receiving a thermostat, a cover for said chamber having a transversely extending bearing, a connecting rod engaging said thermostat and extending transversely to said bearing, a shaft in said bearing, a crank on said shaft engaging said connecting rod, a packing surrounding said shaft, a second crank connected to said shaft, said second crank comprising a pair of metal members secured together in parallel relation and having spaced ends, a block pivotally mounted between said spaced ends, a second connecting rod having said block pivotally mounted thereon, said thermostatic unit being carried by a radiator core, a shutter unit carried by a radiator core and comprising a plurality of shutters, said second connecting rod being connected to the mechanism of said shutter unit.

In witness whereof, I hereunto subscribe my name this 8th day of April, A. D. 1930.

EDGAR G. PETERSEN.